United States Patent [19]

Kley

[11] Patent Number: 4,589,030

[45] Date of Patent: May 13, 1986

[54] SOLID STATE CAMERA

[76] Inventor: Victor B. Kley, 1119 Park Hill Rd., Berkeley, Calif. 94708

[21] Appl. No.: 516,466

[22] Filed: Jul. 25, 1983

[51] Int. Cl.[4] .......................... G01B 11/26; H01J 3/14
[52] U.S. Cl. .................................. 358/225; 358/209; 350/335
[58] Field of Search ................ 358/212, 213, 225, 43, 358/206, 209, 41, 43; 250/216, 578; 350/356, 335

[56] References Cited

U.S. PATENT DOCUMENTS

| | | | |
|---|---|---|---|
| 3,448,210 | 6/1969 | Clayton | 178/7.2 |
| 3,473,872 | 10/1969 | Okamura | 355/1 |
| 3,982,274 | 9/1976 | Chai | 358/41 |
| 3,989,355 | 11/1976 | Wilmer | 350/335 |
| 4,114,037 | 9/1978 | Westwood | 250/216 |
| 4,127,877 | 11/1978 | Morishita | 358/213 |
| 4,204,230 | 5/1980 | Sprague | 358/213 |
| 4,214,264 | 7/1980 | Hayward et al. | 358/44 |
| 4,245,240 | 1/1981 | Tanaka | 358/43 |
| 4,253,120 | 2/1981 | Levine | 358/213 |
| 4,293,871 | 10/1981 | Macovski | 358/44 |
| 4,306,252 | 12/1981 | Fearnside | 358/206 |
| 4,314,761 | 2/1982 | Reymond | 350/356 |
| 4,363,034 | 12/1982 | Grancoin | 358/213 |
| 4,367,493 | 1/1983 | Matteson | 358/293 |
| 4,369,459 | 1/1983 | Iwasawa et al. | 358/50 |
| 4,377,753 | 3/1983 | Mir | 250/216 |
| 4,383,170 | 5/1983 | Takagi et al. | 250/216 |
| 4,441,817 | 4/1984 | Peyor | 250/578 |
| 4,466,702 | 8/1984 | Weiner-Avnear | 350/335 |

OTHER PUBLICATIONS

Nagy, Optical Scanning Digitizers, Computer, vol. 16, No. 5, pp. 13-24.

Primary Examiner—Gene Z. Rubinson
Assistant Examiner—L. C. Schroeder
Attorney, Agent, or Firm—Bernard, Rothwell & Brown

[57] ABSTRACT

An electronic camera has an array of solid state detectors upon which a plurality of selectively masked image regions are superimposed by an optic system. Electrical processing facilities operate an electrical optic mask to sequentially select the image regions to pass light therethrough onto the detector array. Readings from the detector array are processed and used by a video generator to produce an electrical video signal.

11 Claims, 14 Drawing Figures

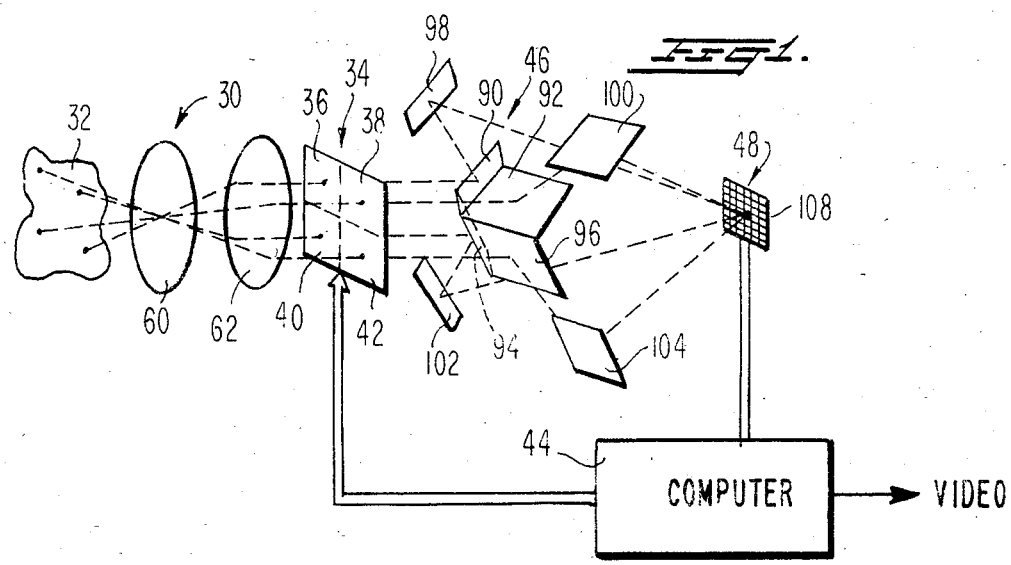
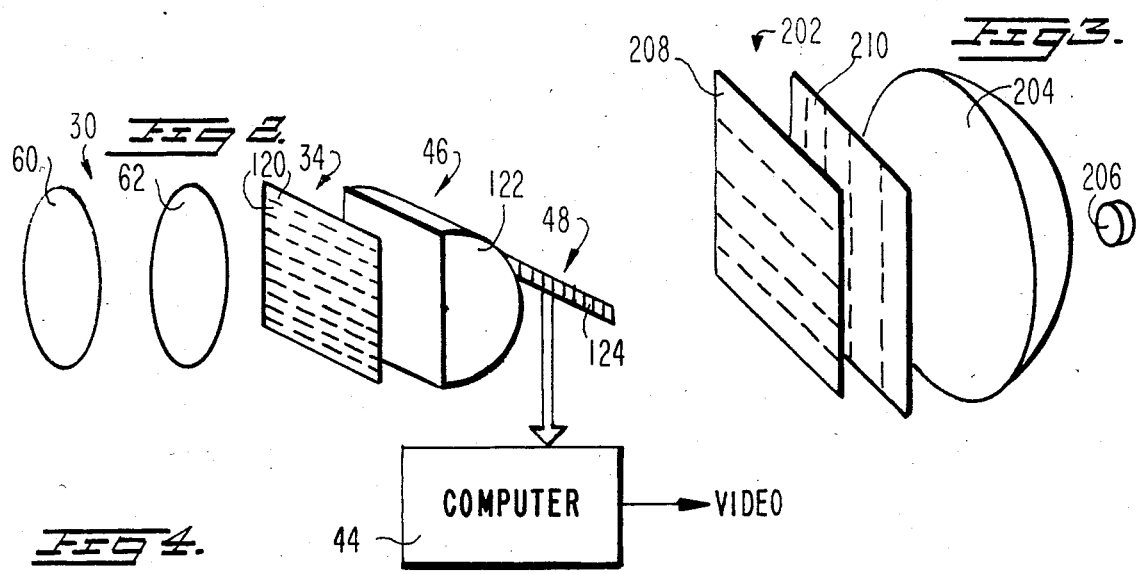
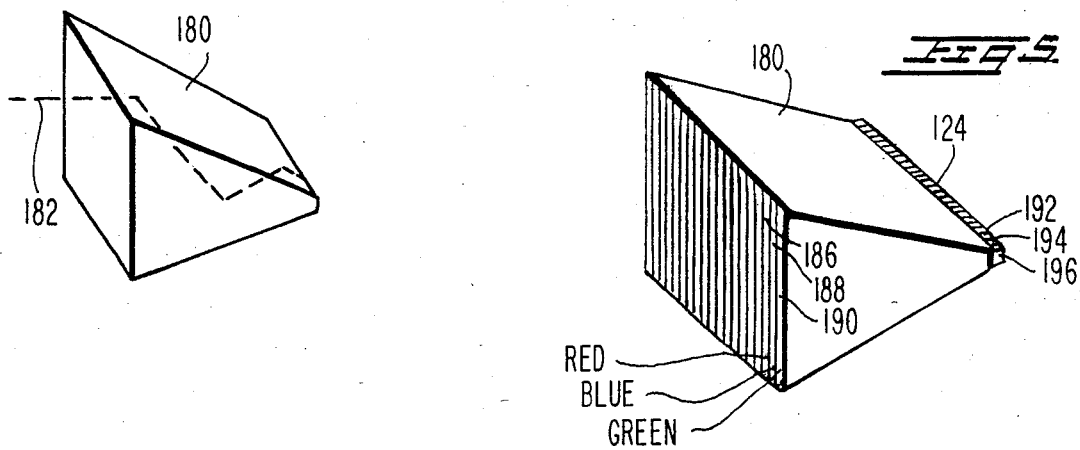

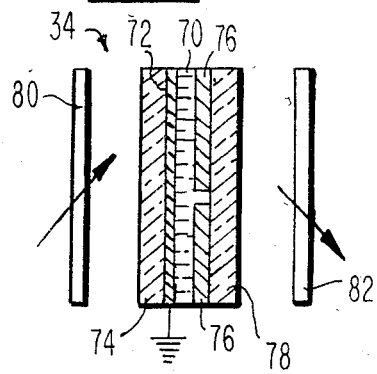
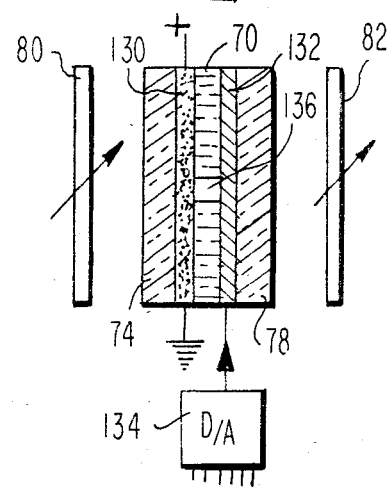
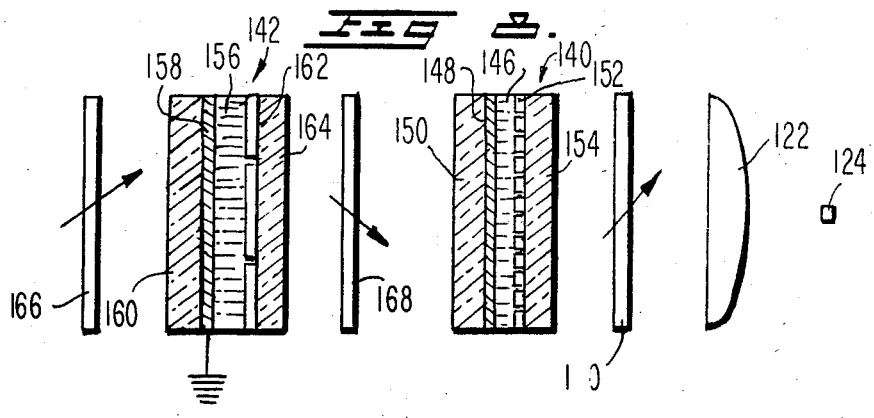
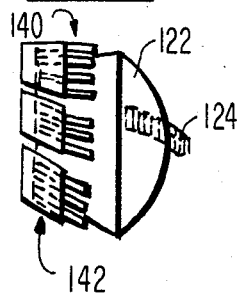
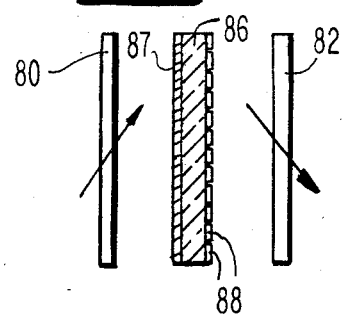

SOLID STATE CAMERA

BACKGROUND OF THE INVENTION

1. Field of the Invention

The present invention relates to cameras employing solid state detector arrays, such as arrays of charge coupled devices, for converting an optical image of an object into electrical signals corresponding to the image, for example video signals for use in television.

2. Description of the Prior Art

The prior art contains solid state cameras, as exemplified in U.S. Pat. Nos. 3,982,274, 4,127,877, 4,204,230, 4,245,240, 4,253,120, 4,306,252, 4,367,493 and 4,369,459, which employ charged coupled devices in linear or rectangular arrays to produce electrical video signals. Some solid state cameras employ a rectangular array upon which the total image of an object is projected; these cameras have one or more deficiencies such as, having poor resolution, being unduly expensive, etc. Other cameras employ linear arrays of detectors and generally require mechanical devices for scanning the object, such as a transport device for moving a document across a slit exposing the array, a moving mirror, or moving aperture device for projecting a line of the image on the detector array; such mechanical scanning devices have one or more deficiencies such as increasing the complexity of the camera, being subject to mechanical failure, being slow, etc.

SUMMARY OF THE INVENTION

The invention is summarized in an electronic camera utilizing an array of solid state detectors upon which a plurality of regions of an image defined by an electrical optical mask are superimposed by an optic system. Electrical processing facilities operate the electrical optic mask to sequentially select the image regions to pass light therethrough onto the detector array, and/or to select all or a group of the image regions to simultaneously pass light therethrough to the detector array. Readings from the detector array are processed and used by a video generator to produce an electrical video signal.

An object of the invention is to construct a solid state camera employing relatively inexpensive solid state detector arrays with improved resolution formed by reading only a small region of the image by the full array.

Another object of the invention is to eliminate mechanical scanning devices for solid state detector arrays.

One advantage of the invention is that a combination of an electro-optic mask defining regions and an optic system for superimposing the regions enables high resolution video generation with a relatively low resolution detector array.

Additional features of the invention enable simultaneous monitoring of superimposed regions to detect changes and then updating display information concerning only the changed region or regions.

Other objects, advantages and features of the invention will be apparent from the following description of the preferred embodiments taken in conjunction with the accompanying drawings.

BRIEF DESCRIPTION OF THE DRAWINGS

FIG. 1 is a perspective schematic illustration of portions of a camera in accordance with the invention.

FIG. 2 is a perspective schematic illustration of portions of a modified camera in accordance with the invention.

FIG. 3 is a perspective schematic illustration of a further modified camera portion in accordance with the invention.

FIG. 4 is a perspective view of a light compression horn which may be substituted for the cylindrical lens of the embodiment of FIG. 2.

FIG. 5 is a perspective illustration of a variation of the horn of FIG. 4 with color detecting facilities.

FIG. 6 is a cross-sectional diagrammatic illustration of an electrical-optical mask suitable for the camera of FIG. 1.

FIG. 7 is a cross-sectional diagrammatical illustration of a mask variation suitable for employment in the camera in FIG. 2.

FIG. 8 is a cross-sectional diagrammatic illustration of another variation of the mask of FIG. 7.

FIG. 9 is a perspective diagramatic illustration of a camera portion employing a mask similar to that of FIG. 8.

FIG. 10 is a cross-sectional diagrammatic illustration of still another electrical-optical mask variations suitable for the camera of FIG. 1.

DESCRIPTION OF THE PREFERRED EMBODIMENTS

Figure 11:
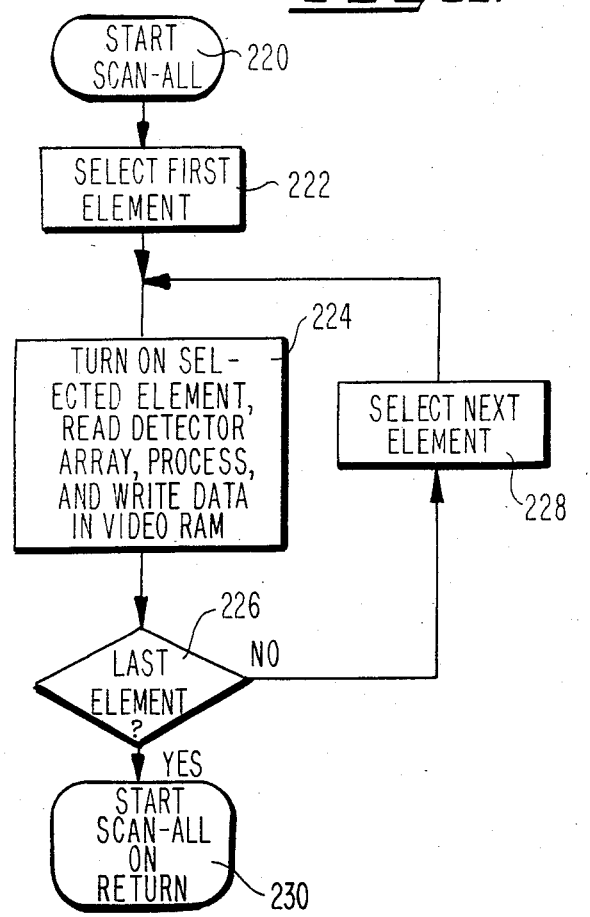
FIG. 11 is a step diagram of a procedure or subroutine in a computer program for operating the computer of FIG. 1.

As shown in FIG. 1, a solid state camera in accordance with the invention includes an objective system indicated generally at 30 for projecting an image of an object or scene 32 upon one side of an electro-optic mask which defines regions, such as equal rectangular regions 36, 38, 40 and 42 of the image. A computer system 44 is connected to the electro-optic mask 34 for selectively activating or deactivating regions 36, 38, 40 and 42 to pass or block the passage of light in image regions through the mask. An optic system indicated generally at 46 superimposes the image segments passing through the corresponding regions 36, 38, 40 and 42 of the mask onto a detector array, such as a charged coupled device (CCD) array indicated generally at 48. The computer system 44 includes facilities for reading the detector array 48 and for processing the readings made for the various regions to produce an electrical output signal, such as a T.V. signal, containing video information corresponding to the object or scene being viewed by the camera.

For simplicity, the objective system 30 is illustrated as a focusing input lens 60 and a collimating lens 62 at the image plane. In reality, the objective system includes a conventional camera lens system such as variable focus and variable telescopic or magnification (zoom) lens system employed in conventional cameras.

The electrical optical mask 34 is any device which can be electrically operated to selectively define different regions through which light or a segment of the image is permitted to pass. Suitable electrical optical devices generally include a layer of optic material which can be rapidly changed from one state to another wherein one state effects light in a manner enabling the blocking of light; such materials include selective birefringent materials such as liquid crystal materials or ferro-optic materials which change birefringence in the different states, and light scattering materials or light blocking materials such as electro-phoretic materials which can be electrically switched into or from a state which scatters or blocks light.

A liquid crystal electro-optical mask device is illustrated in FIG. 6 which includes an electrically responsive material such as a twisted nematic liquid crystal material 70 which becomes birefringent when subjected to an electric field. The layer 70 of LC material is sandwiched between a common transparent conductive electrode 72 on a glass substrate 74 and a plurality of transparent conductive electrodes 76 on a glass substrate 78 defining the regions of the mask 34. The liquid crystal device is positioned between crossed polarizers 80 and 82 so that for regions defined by an energized electrode 76, the device transmits light, the light being blocked by the polarizers for regions defined by non-energized electrodes. Alternatively, the liquid crystal material may be normally birefringent and lose its birefringence when subjected to an electric field; the polarizer 82 would be rotated to have the same polarity as the polarizer 80. Also the polarization of the polarizers 80 and 82 and the birefringence of the liquid crystal material 70 may be selected so that light through energized regions is blocked and light through non-energized regions is passed. As an alternative to crystal material may be heat responsive and the electrodes 76 may be resistances which rapidly heat and switch the liquid crystal materials.

An electrical optical mask variation suitable for use as the mask 34 is shown in FIG. 10 and includes a layer or plate 86 of ferro-optic material, such as gadolinium gallium garnet (iron garnet), lead lanthanum zirconate titanate (PLZT), or other ferro-optic material which is responsive to electric fields. A common transparent electrode 87 is formed on one side of the plate 86 and a plurality of region defining electrodes 88 are formed on the opposite side of the plate 86 for selectively switching birefrigent states of the material 86 to cooperate with polarizers 80 and 82 to selective block and pass light in the regions.

The optic system 46 shown in FIG. 1 is illustrated as a system of mirrors for deflecting and superimposing the light image segments passing through the corresponding regions of the mask 34. For example the light passing through the respective regions 36, 38, 40 and 42 is deflected outwardly by the respective mirrors 90, 92, 94 and 96 and then onto the detector array 48 by respective mirrors 98, 100, 102 and 104. Alternatively the mirrors could be replaced by corresponding reflecting surfaces of one or more prism devices, a plurality of bundles of fiber optics which are combined at one end or tapered to form total internal reflection (TIR) devices exiting to common detectors, or any other refracting or reflecting arrangement designed to superimpose the light pattern segments from the corresponding regions upon a single detector array.

The detector array 48 shown in FIG. 1 is a rectangular array 108 of CCD light sensing cells. The dimensions of the rectangular array 108 corresponds to the dimensions of each of the regions 36, 38, 40 and 42. The number of sensors in the array 108 and the number of regions on the mask 34 are selected to produce the desired resolution for the camera.

The computer 44 includes conventional input and output circuitry for operating the electro-optical mask 34 and for obtaining digital readings from analog signals from each of the cells of the CCD array 108. The computer also includes a random access memory (RAM) and suitable programming for processing the readings from the array and for storing informations in the RAM. A video generator is included in the computer for producing an electical video signal or T.V. signal from the information stored in RAM.

In a modification illustrated in FIG. 2, the mask 34 defines horizontal regions or strips 120 which have a width corresponding to the desired resolution. The optic system 46 for superimposing the image regions from strips 120 is formed by a cylindrical lens 122, and the array 48 is formed by a linear horizontal array 124. The cylindrical lens 122 is designed to focus all of the light passing through the mask 34 onto the linear array 124 such that each detector 124 receives light from one point on each horizontal line 120 along a corresponding vertical line or strip (not shown). The regions 120 of the mask 34 may be defined by horizontal electrode strips such as the strip electrodes 88 of FIG. 10.

A variation of the mask 34 is shown in FIG. 7 for generating horizontal lines or strips for being superimposed on the linear detector array 124. The electro-optic material layer such as liquid crystal layer 70 is sandwiched between a transparent resistance electrode 130 on the glass plate 174 and a transparent conductive electrode 132 on the glass plate 78. A voltage is applied between the upper and lower edges of the resistive electrode 130 to establish a linear voltage gradient throughout the vertical dimension thereof. A digital to analog voltage converter 134 driven by the computer 44 applies a voltage to the electrode 132. The voltage applied across the upper and lower edges of the resistive electrode 130 and the voltage on electrode 132 are selected to produce a voltage between the electrodes 130 and 132 which is sufficient to render the LCD material 70 birefringent, or non-birefringent except along a narrow horizontal region or slot 136, where the voltage on the electrode 132 is substantially equal to the voltage on the resistance electrode 130. By selecting the analog voltage from the digital to analog converter 134, the transmitting area 136 of the mask 34 can be selected to have any vertical position on the mask.

In a practical mask utilizing polarizers and birefringent electro-optic switching material such as some of the twisted nematic liquid crystal materials, the effective blocking of light passage by nonselected elements may not be sufficient to enable effective operation of the camera. For example, some twisted nematic crystal materials in combination with polarizers may pass up to 5 percent of the potential incident light energy when in the off or blocking state, thus with 20 such elements being summed at a detector, a full on state single element flex level may be obtained even though all of the 20 elements are in the off or blocking state. A multiple layered mask arrangement, such as the overlapping mask layers indicated generally at 140 and 142 in FIGS. 8 and 9, can be utilized to overcome this deficiency. With each layer passing only 5 percent in the off state, the total light passed through 20 regions would be 5 percent of 5 percent or 0.25 percent which would amount to only five percent of the fully on condition of a single region. This is sufficient to enable the producing of an adequate contrast ratio in the camera. It is not necessary that all layers contain the fine lines or regions to be scanned in order to produce adequate contrast ratio. For the example of FIGS. 8 and 9, the layer 140 contains the individual lines or strips to be scanned while the layer 12 defines broader regions encompassing several of the scans or strips regions of the layer 140. The passage of extra light through the nonselected regions of 140 superimposed with the selected region of 142 results in some degration of the contrast but not to an extent which significantly effects the ability of the camera to distinguish dark and light pictorial areas. The particular multi-layered mask structure illustrated in FIG. 8 includes a first layer of electro-optic material 146 sandwiched between a common transparent conductive electrode 148 on a substrate 150 and a plurality of transparent conductive strips or lines 152 on a glass substrate 154 for defining the line or strip regions of the mask layer 140. A second layer electro-optic material 156 is sandwiched between a common electrode 158 on a glass substrate 160 and a plurality of larger regional electrodes 162 on a glass substrate 164 for defining the larger region selecting mask layer 142. A polarizer 166 of a first polarity is disposed in front of the unit 142 while a polarizer 168 of the opposite polarity is disposed between the units 142 and 140. A polarizer 170 of the first polarity is then disposed at the exit side of the unit 140 to complete the dual layer mask structure.

As an alternative to the cylindrical lens 122 in the systems of FIGS. 2, 8 and 9, the camera may employ a light compression horn 180, FIG. 4, formed from total internal reflection (TIR) components. A light ray 182 entering at any vertical position into the left side of the TIR horn is deflected in a conventional manner to exit at one common vertical position on the right side of the horn to thus superimpose all of the strips or line regions selected by the mask arrangement.

Additionally, the camera can be easily utilized for color video generation. In the example shown in FIG. 5, the face of the TIR horn 180 is coated with a plurality of groups of vertical strips wherein each group includes a filter strip 186 passing only red light, a filter strip 188 passing only blue light and a filter strip 190 passing only green light. Thus in the linear detector array 124, the detector element 192 senses red light, the detector element 194 senses blue light and the detector element 196 senses green light. Alternatively, the color filter strips may be disposed at the image plane, on the face of the cylindrical lens 122 of FIG. 2, or at any other suitable position in the camera system, such as on the rear end of the TIR horn 180 or on the face of the elements of the detector arrays 124 in FIGS. 2 and 5. Also the TIR horn can be formed with layers that filter different colors, or the light can be dispersed into different color portions by prism refraction or the like together with provision of three parallel linear arrays to detect the respective dispersed color portions.

An alternative mask arrangement is indicated generally at 202 in FIG. 3 together with a lens 204 focusing light passing through the arrangement 202 on a single detector 206 for spot scanning the image of an object. The arrangement 202 is formed by first and second masks 208 and 210 which form orthogonally related strips defining points. Selection of each intersection or rectangular spot in turn enables the scanning of the entire image or electronic symbol of the image. The strips need not be orthogonal and likewise do not need to be equal.

The operation of the solid state camera in accordance with the invention is illustrated by the step diagram of FIG. 11 which may be a main procedure or a subroutine called by a timer interrupt or another program. The procedure starts at point 220 and proceeds to step 222 where the first element or region of the mask is defined or pointed to. From step 222 the program proceeds to step 224 where the element previously pointed out or selected is turned on to transmit the area or strip of light to the detector array. The computer reads the detector array, processes the read information to put it into proper form, and writes the processed data into the portion of the RAM corresponding to the selected area or region of the image. From step 224 the program proceeds to step 226 where it is determined if the last region has been read. The program proceeds to step 228 in the event that the region read is not the last element of the image. In step 228 the next element is selected returning to step 224 until the scanning of the entire image is completed. When the last element is detected in step 226 the program proceeds to step 230 where the program returns to the starting point 220 or to the calling program.

In many applications, it is not necessary that the camera continuously scan all of the image area. In fact due to the time necessary for switching the mask regions, it may be impracticable within the allotted time period to scan the whole image where a portion of the image changes rapidly. In such a circumstance a portion of the image where the changes occur rapidly may be scanned separately at a relatively high rate of frequency. The routine beginning at point 234 in FIG. 13 includes steps 236, 238, 240, 242 and 244 similar to steps 220, 224, 226, 228 and 230 of FIG. 11 wherein the scanning occurs only within a selected area of the image element by element. This procedure for scanning only a selected area may be incorporated within a program where the desired area is scanned often and the whole image is scanned much less often.

As an alternative, the camera system may be designed to detect changes within larger areas of the image and to perform scans of such image areas only when a change is detected. Each larger area includes several image regions, for example in FIG. 1 one area may include the top regions 36 and 38, in FIG. 2 an area may include 3 or 4 strips or lines 120, or in FIG. 2 an area may include several strips or lines 120 spaced throughout the total image. The regions in each area are simultaneously selected to pass light with the system designed to produce only partial light saturation of the detectors with less than full light passing through all of the elements being summed at a particular detector cell of the detector array. The readings of the detectors for each larger area are compared with previous readings to detect a change. Readings from individual regions within each area only occurs when a change is detected within the area.

Figure 12:
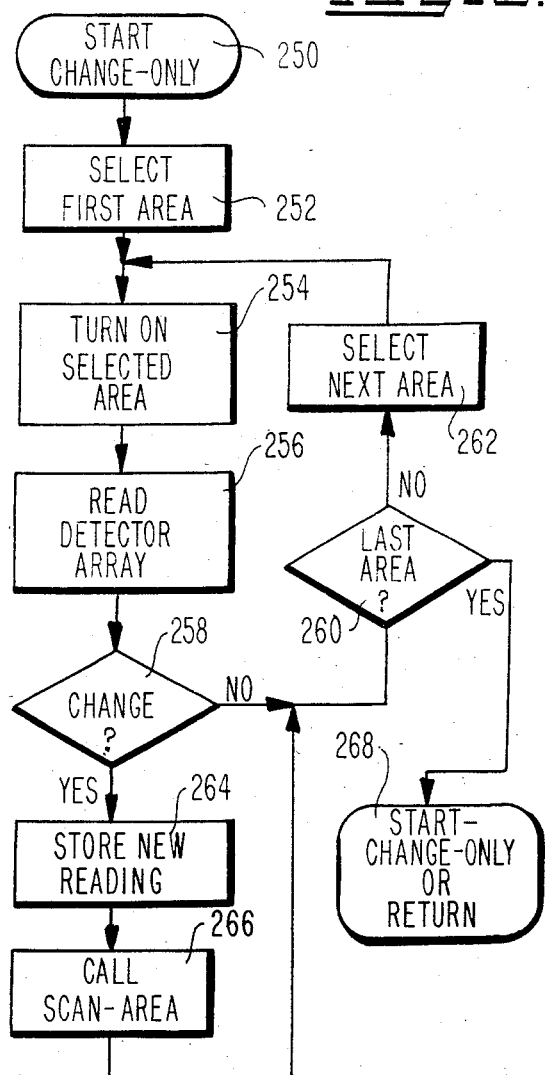
FIG. 12 is step diagram of a second or alternative procedure or subroutine in a computer program for operating the computer of FIG. 1.
Figure 13:
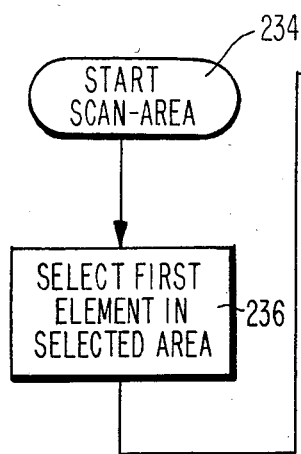
FIG. 13 is a step diagram of a third possible subroutine or procedure in a computer program for the computer of FIG. 1.

A procedure for continuously monitoring for changes in larger areas of the image and for updating the portion of RAM corresponding to a selected area only when a change is detected in the selected area is illustrated in FIG. 12 starting at point 250. From point 250 the program proceeds to step 252 where the first area is selected or pointed to. In the next step 254 the selected area is turned on and then in step 256 the detector array is read. In step 258 the reading made in step 256 is compared with a previously stored reading and if there is no change, the program proceeds to step 260 where it is determined if the last area is selected. If the last area has not been selected the program proceeds to step 262 where the next area is selected or pointed to after which the program returns to step 254. In the event that a change in the reading of the detector array is sensed in step 258 the program proceeds to step 256 where the new reading is stored within the RAM for future reference. In the following step 266 the procedure of FIG. 13 is called to scan each of the regions or strips within the selected area. After the video information is updated by the called routine in step 266 the program returns to step 260. If the program reaches the last area in step 260, the program goes to step 268 which causes a return to either the start point 250 or to the calling program. It is noted that it is not necessary for the selected regions forming an area to be adjacent to each other to form a complete area; and other regions may be separated for example line regions may be selected at a multiple such as every fourth line. Additionally certain areas may be read for changes at a rate greater than other areas where the changes are less likely to occur.

Figure 14:
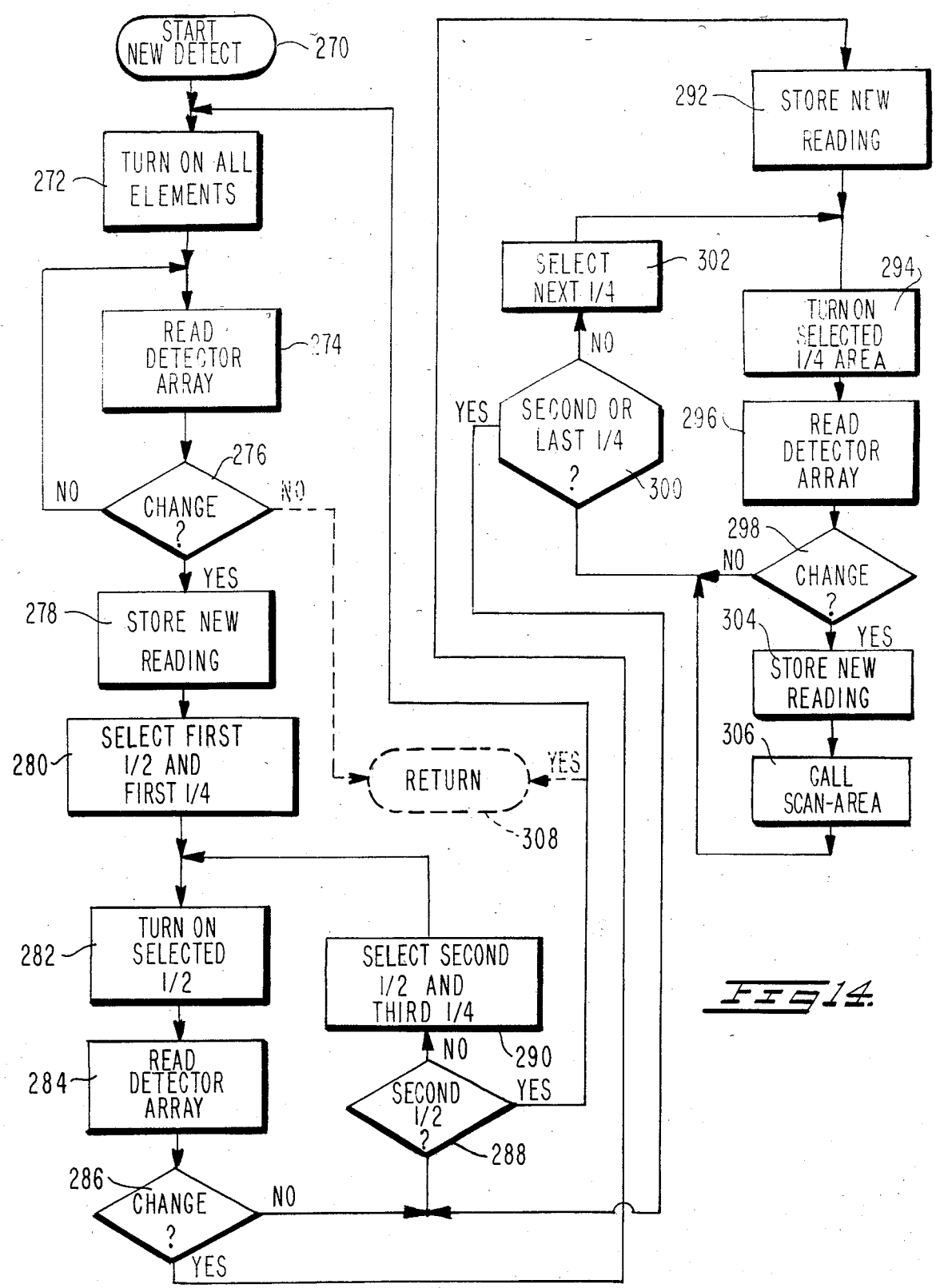
FIG. 14 is a step diagram a further or alternative computer procedure or subroutine in a program for the computer of FIG. 1.

In FIG. 14 there is shown a computer procedure particularly suitable for detecting the entry or intrusion of an image element into the existing image. From the starting point 270 the program proceeds to step 272 where all of the regions are simultaneously selected to pass light so that the total image is summed at the detector array; the light intensity and the detector array being selected so that each detector cell remains unsaturated with less than full light intensity from all of the portions of the image regions corresponding to each detecting cell. From step 272 the program proceeds to step 274 where the detector array is read and then step 276 where the reading in step 274 is compared with a previously stored reading to detect if there has been any change in the reading. In the event there has been no change the program returns to step 274 and again reads the detector array. This is repeated until a change is detected in step 276 whereupon the program branches to step 278 where the new reading from the new detector array is stored. From step 278 the program proceeds to step 280 where a first one half of the image elements and a first one fourth of the image elements are pointed to. In the next step 282 the regions within the first one half of the image pointed to in step 280 are selected to pass light. Then in step 284 the detector array is read, and in step 286 the reading of step 284 is compared with a previously stored reading for the selected half. If no change is detected in the selected half, the program proceeds to step 288 where the program determines if the present reading is for the second half or for the first one half. If it is for the first one half the program proceeds to step 290 where the second one half and the third fourth are selected or pointed to after which the program returns to point 282 where the regions in the second half are selected or turned on to pass light. If a change in the selected half is true in step 286, the program branches to step 292 where the new reading for the selected half is stored. From step 292 the program proceeds to step 294 where the regions in the selected one fourth area are selected or turned on, the rest of the image being turned off to block light passage therethrough. Then in step 296 the detector array is read and this reading, in step 298, is compared with a previously stored reading. If no change is detected the program proceeds to step 300 where the program determines if it is the second one fourth or the last one fourth being read. If false, the program proceeds to step 302 where the next one fourth is selected and the program returns to step 294. If the change in step 298 is found true, the program proceeds to step 304 where the new reading for the selected one fourth is stored in RAM and then to step 306 where the scan procedure of FIG. 13 is called. After the area has been scanned, the program then returns to step 300. If the query in step 300 is true, the program branches to step 288, and if true in step 288 the program returns to the start point 270 and the first step 272. Alternatively as shown by the dashed lines, the program may execute a return upon a false from step 276 or a true from step 288; this will occur if the procedure of FIG. 14 is a subroutine which is called by an interrupt or another part of the program.

The solid state camera of the present invention is particularly advantageous for enabling the production of a solid state camera utilizing relatively low cost CCD detector arrays but offering substantially greater resolution than has been heretofore possible with the detector arrays of the same type. The low cost CCD detector arrays generally do not offer sufficient resolution to enable direct scanning of an entire image. Furthermore in the particular present design the invention eliminates mechanical scanning devices such as revolving mirrors, rotating discs or drums, document moving facilities, etc. necessary in the prior art to produce scanning.

The employment of liquid crystal materials particularly provides a relatively inexpensive scanning procedure. The utilization of summation for simultaneously reading several regions to detect changes permits the avoidance of repeatedly scanning the whole image to enable keeping up with the changes in the image which incur only within a portion of the image. This enables updating of the video information at a rate suitable to compare with image changes produced in existing vidicon or other television systems.

Furthermore the employment of superimposed liquid crystal or optical electrical layers to improve contrast enables the employment of practical liquid crystal devices for scanning purposes.

Since many modification, variations and changes in detail may be made to the above-described embodiments, it is intended that all matter described in the foregoing description and shown in the accompanying drawings be interrupted as illustrative and not in a limiting sense.

What is claimed is:

1. An electronic camera comprising:
   a linear array of solid state light detectors, planar electro-optic mask means for defining different narrow slit-like image regions extending across the mask means and including electrically operated means for selectively passing light through the different image regions of the mask, said image regions each dimensionally corresponding to the array of light detectors,
   objective means for projecting an image of an object on a first side of the mask means,
   optic means for superimposing the different image regions from the second side of the mask means into a single line image which is collinear with the array of light detectors wherein each portion of the single line image includes the corresponding superimposed portions of all of the different slit-like image regions from the mask means, and electrical processing means for operating the mask means and for reading the array of light detectors to produce electrical signals corresponding to the image of the object.

2. An electronic camera as claimed in claim 1 wherein the mask means includes an electo-optic layer of liquid crystal or ferro-optic material and electrode means for defining the different image regions of the mask.

3. An electronic camera as claimed in claim 2 wherein the mask means includes a second layer of electro-optic material with second electrodes defining image regions superimposed over the image regions defined by the first layer and electrodes for improving the percentage of light blocked by the mask means.

4. An electronic camera as claimed in claim 3 wherein the image regions of the second layer and electrodes each overlap a plurality of image and electrode regions defined by the first layer.

5. An electronic camera as claimed in claim 3 wherein the electrical processing means includes means for sequentially operating the light passing means to sequentially pass light through the different image regions of the mask means, and means for reading the output of the array of detectors during each corresponding operation of the mask means.

6. An electronic camera as claimed in claim 5 where the electrical processing means includes a computer having a random access memory and a video generator for producing electrical video signals from the information stored within the random access memory.

7. An electronic camera as claimed in claim 1 wherein the electrical processing means includes computer means for operating the mask means and for reading the array of light detectors; the computer means including a random access memory, means for processing and storing information in the random access memory from the readings of the array of light detectors, and a video generator for generating an electrical video signal from the information stored in the random access memory.

8. An electronic camera comprising:
a linear array of solid state light detectors,
planar electro-optic mask means for defining different narrow slit-like image regions extending across the mask means and including electrically operated means for selectively passing light through the different image regions of the mask, said image regions each dimensionally corresponding to the array of light detectors,
objective means for projecting an image of an object on a first side of the mask means,
optic means including cylindrical lens means for focusing the slit-like image regions from the second side of the mask means on the linear array of light detectors, and
electrical processing means for operating the mask means and for reading the array of light detectors to produce electrical signals corresponding to the image of the object.

9. An electronic camera comprising:
a linear array of solid state light detectors,
planar electro-optic mask means for defining different narrow slit-like image regions extending across the mask means and including electrically operated means for selectively passing light through the different image regions of the mask, said image regions each dimensionally corresponding to the array of light detectors,
objective means for projecting an image of an object on a first side of the mask means,
optic means including light compression horn means for superimposing the slit-like image regions from the second side of the mask means on the linear array of light detectors, and
electrical processing means for operating the mask means and for reading the array of light detectors to produce electrical signals corresponding to the image of the object.

10. An electronic camera comprising:
an array of solid state light detectors,
planar electro-optic mask means for defining different image regions and including electrically operated means for selectively passing light through the different image regions of the mask, said image regions each dimensionally corresponding to the array of light detectors;
objective means for projecting an image of an object on a first side of the mask means;
optic means for superimposing the different image regions from the second side of the mask means on the array of light detectors;
electrical processing means including computer means for operating the mask means and for reading the array of light detectors to produce electrical signals corresponding to the image of the object;
said computer means including a randon access memory, means for processing and storing information in the random access memory from the readings of the array of light detectors, and a video generator for generating an electrical video signal from the information stored in the random access memory; and
said computer means further including means for simultaneously selecting a plurality of the mask image regions to simultaneously superimpose light from the selected plurality of mask image regions onto the detector array, means for comparing the detector array output with a previously stored reading of the detector array to determine whether a change in the selected plurality of mask image regions has occurred, and means responsive to determining that a change has occured for storing a new detector array reading and for sequentially selecting each of the selected plurality of mask image regions and for reading, processing and storing information from the readings in the random access memory.

11. An electronic camera as claimed in claim 10 wherein the computer means includes means for simultaneously selecting all of the plurality of mask image regions to superimpose light from all of the regions of the mask on the detector array, means for comparing a reading of the detector array with a previously stored detector array reading to determine if a change in the image has occurred, means responsive to the detection of a change in the image for selecting a first half of the plurality of image mask regions to superimpose light from the selected half of the image regions on the detector array, means for reading the detector array for the selected half of the image regions and for comparing the reading of the detector array with a previously stored reading to determine a change in the selected half, means responsive to a change in the selected half for selecting one fourth of the image regions, the selected one-fourth being within the half in which a change is detected to superimpose light from the selected one-fourth on the detector array, means for reading the detector array for the selected one-fourth of the image regions and for comparing the reading of the detector array with a previously stored reading to determine a change in the selected one-fourth, means responsive to a change within the selected one-fourth for sequentially selecting each mask image region within the selected one-fourth, means for reading the detector array for each selected region and for processing and storing corresponding information in the random access memory, means for selecting the next one-fourth in the event the previous one fourth was not the second or last one fourth, and means for selecting the second half in the event that the selected half was not the second half.

* * * * *